US008417082B2

(12) United States Patent
Vastmans et al.

(10) Patent No.: US 8,417,082 B2
(45) Date of Patent: Apr. 9, 2013

(54) STRAIN RELIEF FOR OPTICAL FIBRE CABLES AND PATCH CORDS

(75) Inventors: Kristof Vastmans, Boutersem (BE); Mohammed Labraymi, Antwerp (BE)

(73) Assignee: Tyco Electronics Raychem BVBA, Kessel-Lo (BE)

(*) Notice: Subject to any disclaimer, the term of this patent is extended or adjusted under 35 U.S.C. 154(b) by 0 days.

(21) Appl. No.: 12/600,088

(22) PCT Filed: May 6, 2008

(86) PCT No.: PCT/GB2008/050327
§ 371 (c)(1), (2), (4) Date: Nov. 13, 2009

(87) PCT Pub. No.: WO2008/139218
PCT Pub. Date: Nov. 20, 2008

(65) Prior Publication Data
US 2010/0272408 A1    Oct. 28, 2010

(30) Foreign Application Priority Data
May 15, 2007   (GB) .................................. 0709310.7

(51) Int. Cl.
*G02B 6/00* (2006.01)
(52) U.S. Cl.
USPC .......................................................... 385/135

(58) Field of Classification Search ................... 385/135
See application file for complete search history.

(56) References Cited

U.S. PATENT DOCUMENTS
6,741,784 B1 * 5/2004 Guan ............................. 385/135
2008/0273837 A1 * 11/2008 Margolin et al. ............... 385/62

FOREIGN PATENT DOCUMENTS
EP    1 014 126 A    6/2000
EP    1 143 570 A    10/2001
EP    1 168 020 A    1/2002

OTHER PUBLICATIONS
Search Report for PCT/GB2008/050327 issued by the European Patent Office on Oct. 6, 2008.

* cited by examiner

*Primary Examiner* — Ryan Lepisto
*Assistant Examiner* — Jerry Blevins
(74) *Attorney, Agent, or Firm* — Faegre Baker Daniels LLP

(57) ABSTRACT

An enclosure (10) for optical fibre cable or patch cord connections comprising a casing (20), an optical connection adaptor (80), a holder (90) for the connection adaptor, and cable or cord strain relief means attachable to the casing, wherein the holder is integral with or secured or securable within the casing and allows limited axial movement of the adaptor inside the holder over an axial distance ($\alpha$) greater than the distance of flexural distortion of the casing which is caused at the point of strain relief attachment by manual traction on the cable or cord outside the casing.

15 Claims, 8 Drawing Sheets

STRAIN RELIEF FOR OPTICAL FIBRE CABLES AND PATCH CORDS

This invention relates to strain relief for connectorised optical fibre cables and patch cords, which may have particular utility, inter alia, in Fibre To The Home connections (FTTH).

Strain relief means may be provided for fixing a connectorized optical fibre drop cable or patch cord to a casing or any other solid part of a termination or connection box or other enclosure. This may be done by any convenient means of attachment, for example, by securing a suitably formed connector of such a cable or cord in an aperture of a lid or other closure member which closes in a direction lateral to the optical fibre axis, as provided in the FTTH connection boxes available from Tyco Electronics under the trade mark "Xpress drop". A preferred form of strain relief means is a collared optical connector having a gap between two collars extending laterally (relative to the cable or cord longitudinal axis), which gap fits onto the casing or other wall-like part of the connection box or other enclosure.

The present invention provides an enclosure for optical fibre cable or patch cord connections comprising a casing, an optical connection adaptor, a holder for the connection adaptor, and cable or cord strain relief means attachable to the casing, wherein the holder is integral with or secured or securable within the casing and allows limited axial movement of the adaptor inside the holder over an axial distance greater than the distance of flexural distortion of the casing which is caused at the point of strain relief attachment by manual traction on the cable or cord outside the casing.

In one preferred form of the invention, the casing is closable around the adaptor and holder to attach the cable or cord to the casing and the casing includes spacer means which on closure of the casing acts to push the adaptor within the holder away from the casing to an axial distance greater than the distance of flexural distortion of the casing which is caused at the point of strain relief attachment by manual traction on the cable or cord outside the casing.

By thus ensuring a preventive axial spacing or push-back of the adaptor, the present invention allows for a safe casing bend distance with minimal risk of signal disruption, resulting in a reliable connection that can comply with high retention specifications with a fast and easy connection. This inventive concept thus reduces the negative effect of casing distortion due to an axial pull caused by any kind of applied tension on the connectorised cable or cord, which could otherwise disconnect or disturb the connection formed by suitable connector means inside the adaptor. This can be especially useful in FTTH applications, since we see that such domestic applications have a relatively high risk of subjection to impact and pull forces.

In all forms of the invention, it is preferable that the said axial spacing or push-back distance is greater than the flexural casing distortion distance caused by the maximum traction force applicable to the cable or cord without dislodging the strain relief attachment. The casing may be made of plastics material and preferably has a thickness within the range from 0.5 mm to 4 mm. The spacer means when used is preferably arranged to produce a preventive axial push-back distance of at least 0.2 mm, preferably at least 1 mm, more preferably at least 2 mm. The adaptor is preferably snap-fitted into the holder.

The holder can be a stand-alone part or integrated on another component of the enclosure. The adaptor will preferably be installed in the holder through horizontal or vertical snap-in lips which resist accidental removal of the installed adaptor from the holder.

In preferred arrangements, the adaptor may be initially at its pulled-forward position, and the closable casing mechanism (preferably a lid) may have ramps or other sloping features that slide across the fibre axis on closure of the casing (preferably lid) and engage the adaptor or associated components to force the cable and adaptor to move back in the holder for a certain axial distance greater than the bending strain distance of the housing likely to be encountered in practice.

The enclosure casing, the holder, and the adaptor and other components of this invention may be made of any suitable materials, preferably engineering plastics, using any suitable manufacturing techniques, preferably injection moulding, as generally known.

A specific embodiment of the invention will now be described in more detail by way of example, with reference to the accompanying drawings, wherein.

Figure 1:
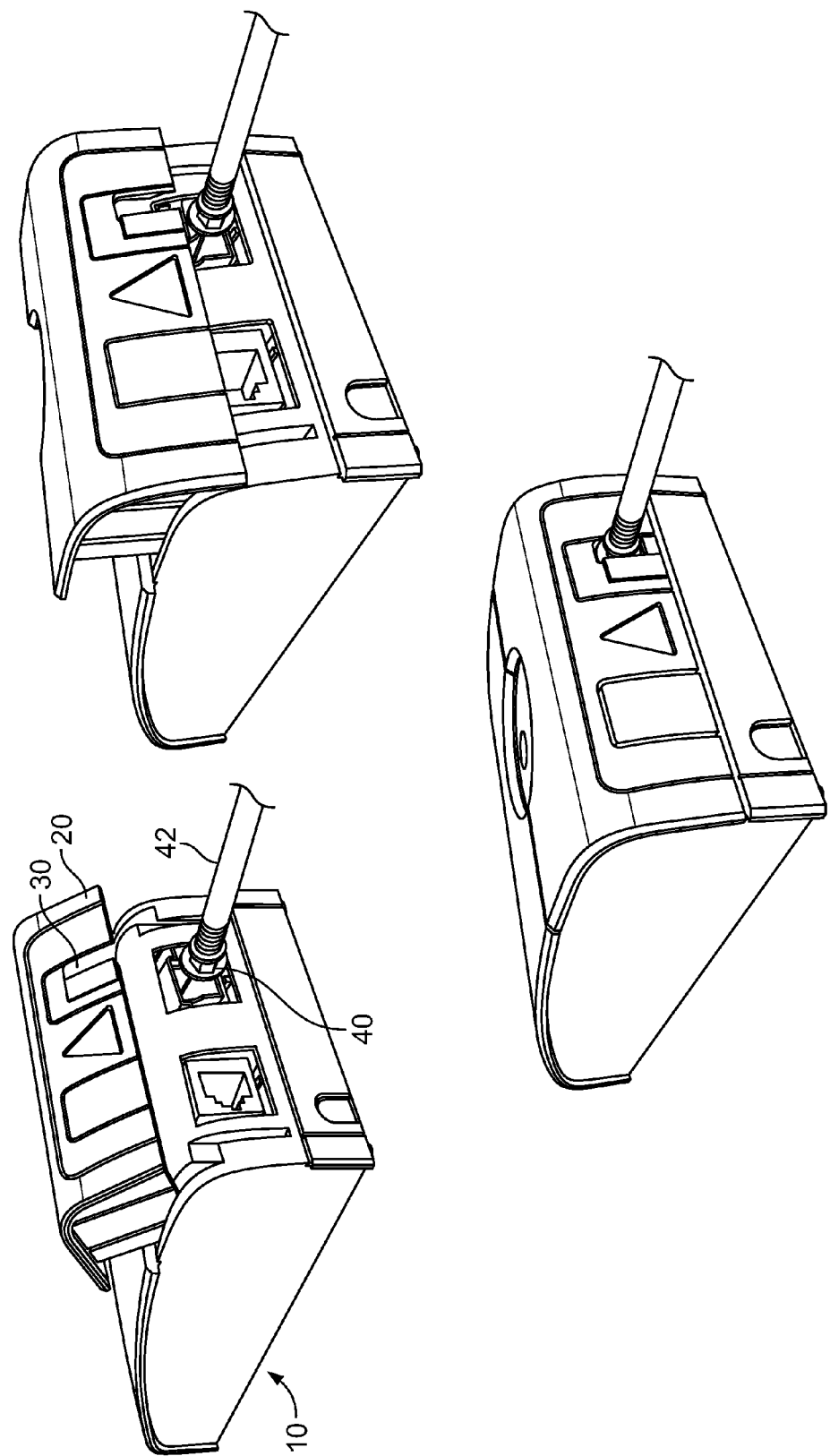
FIG. 1 shows in perspective an FFTH connection box in open, half-closed, and fully closed states.

Referring now to the drawings, FIG. 1 shows in perspective an example of one kind of "Xpress drop" FTTH connector box 10 according to the present invention having a casing including slidable lid 20, with an optical fibre drop cable 42 connected to the box via optical connector 40 of known kind. The lid 20 has a slot 30 which progressively traps the connector 40 to secure the cable to the box as the lid 20 is moved from the open position shown in the upper view, through the half-closed position shown in the middle view, to reach the fully-closed position shown in the lower view.

Figure 2:
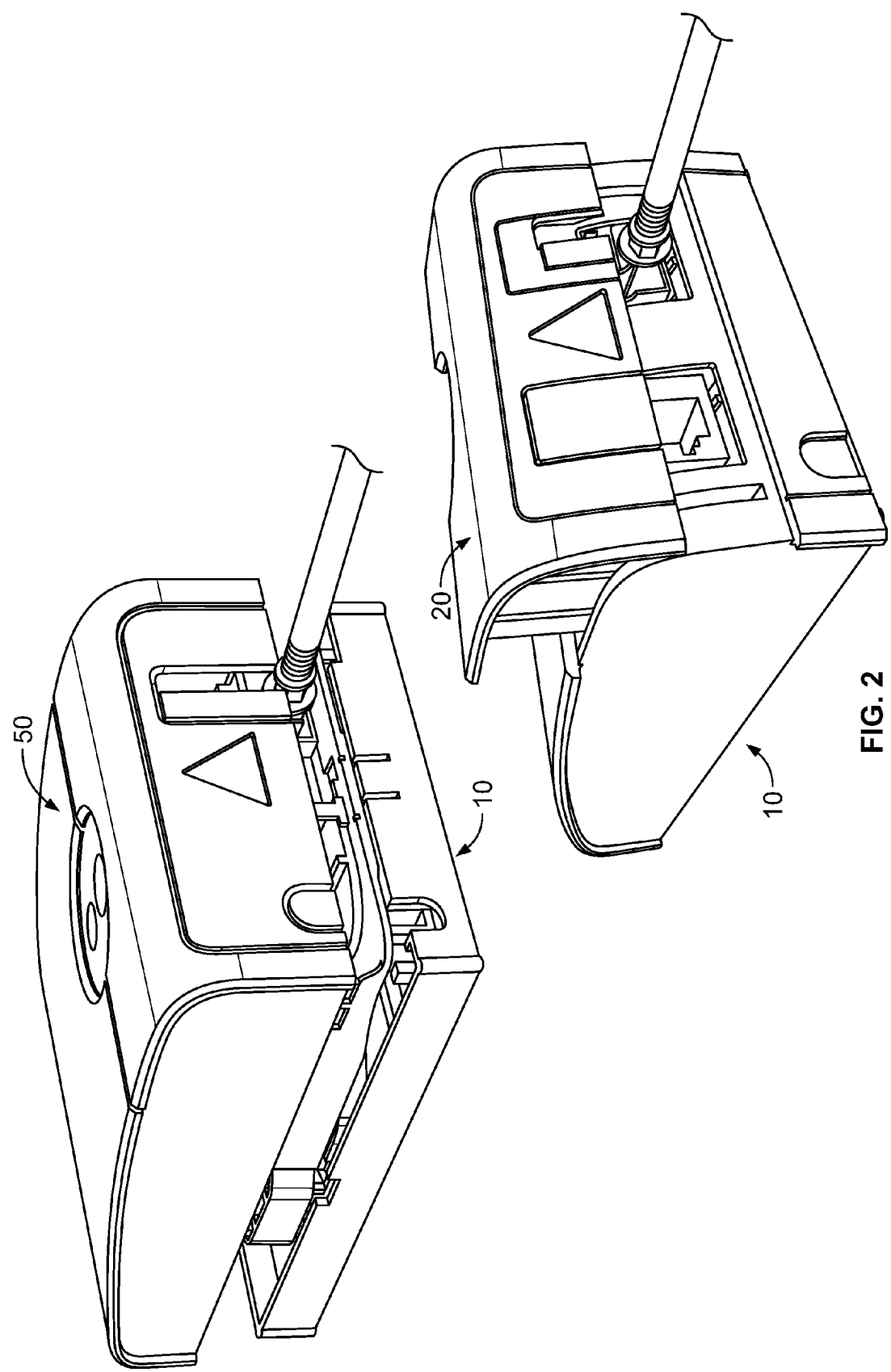
FIG. 2 shows in perspective the box of FIG. 1 in the picture on the right-hand side of the Figure, and an alternative type of box in the picture on the left-hand side of the Figure.

FIG. 2 shows on the right the connection box of FIG. 1, and on the left an alternative form of box wherein the entire upper casing shell 50 is to be slid onto a support thus trapping the connector in a manner similar to the action of the separate lid shown in the right-hand view and in FIG. 1.

Figure 3:
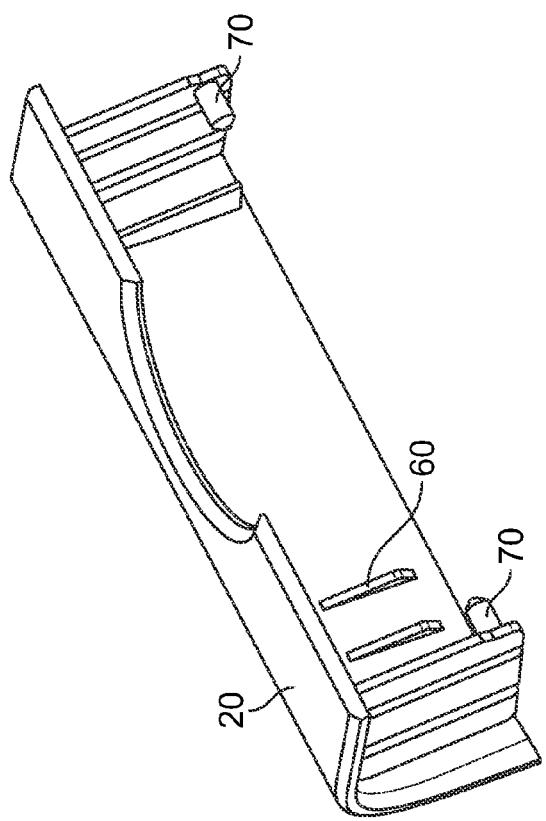
FIG. 3 shows in more detail the spacer means formed on the inside of the lid.
Figure 3:
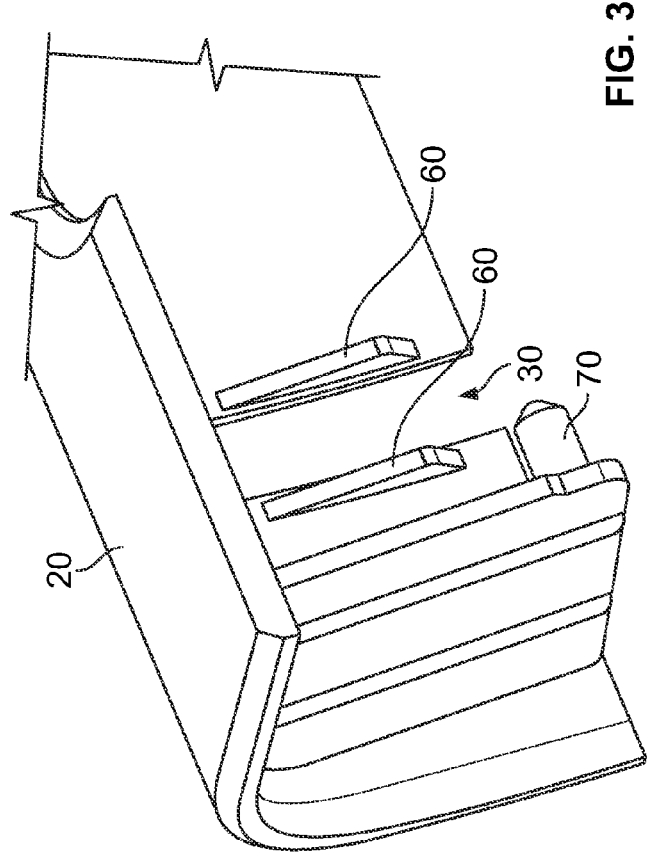

FIG. 3 shows an enlarged portion of the interior of the lid 20 with the spacer means 60 in the form of tapered ribs on either side of the slot 30. This view also shows stub shafts 70 which may be provided for pivotable mounting of the lid, as an alternative to the sliding action of the lid shown in FIG. 1.

Figure 4:
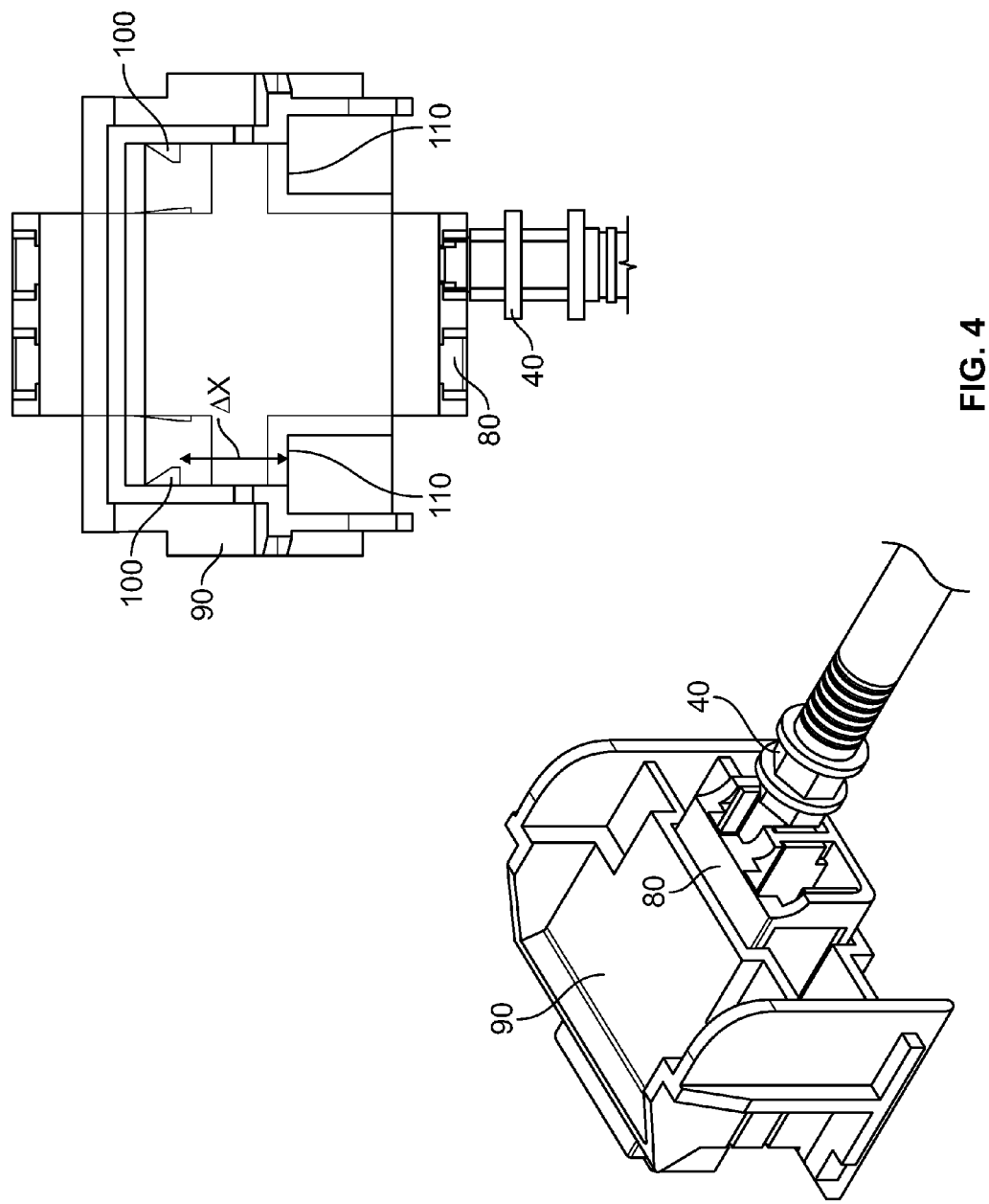
FIG. 4 shows in more detail the adaptor and holder according to the invention.

FIG. 4 shows in perspective and plan views the holder 90, which is positioned within, preferably integral with or fixed to, the casing and/or the base of the connection box (not shown in this view). This FIG. 4 also shows the adaptor 80 received in the holder by snap-fitting of the adaptor past retaining lugs 100. The adaptor 80 receives the cable connector 40 and the adaptor is movable within the holder over the indicated distance $\Delta X$ between the lugs 100 and the stop surface 110. The distance $\Delta X$ is greater than the maximum likely flex deformation distance of the casing under normal traction of the cable at the connection point where the casing holds the cable connector 40 in the slot 30. The adaptor 80 is thus enabled to "float" within the distance ΔX, enabling the spacer ribs 60 to force the adaptor away from the cable connection point of the casing when the lid 20 is closed, as shown in FIGS. 5 and 6.

Figure 5:
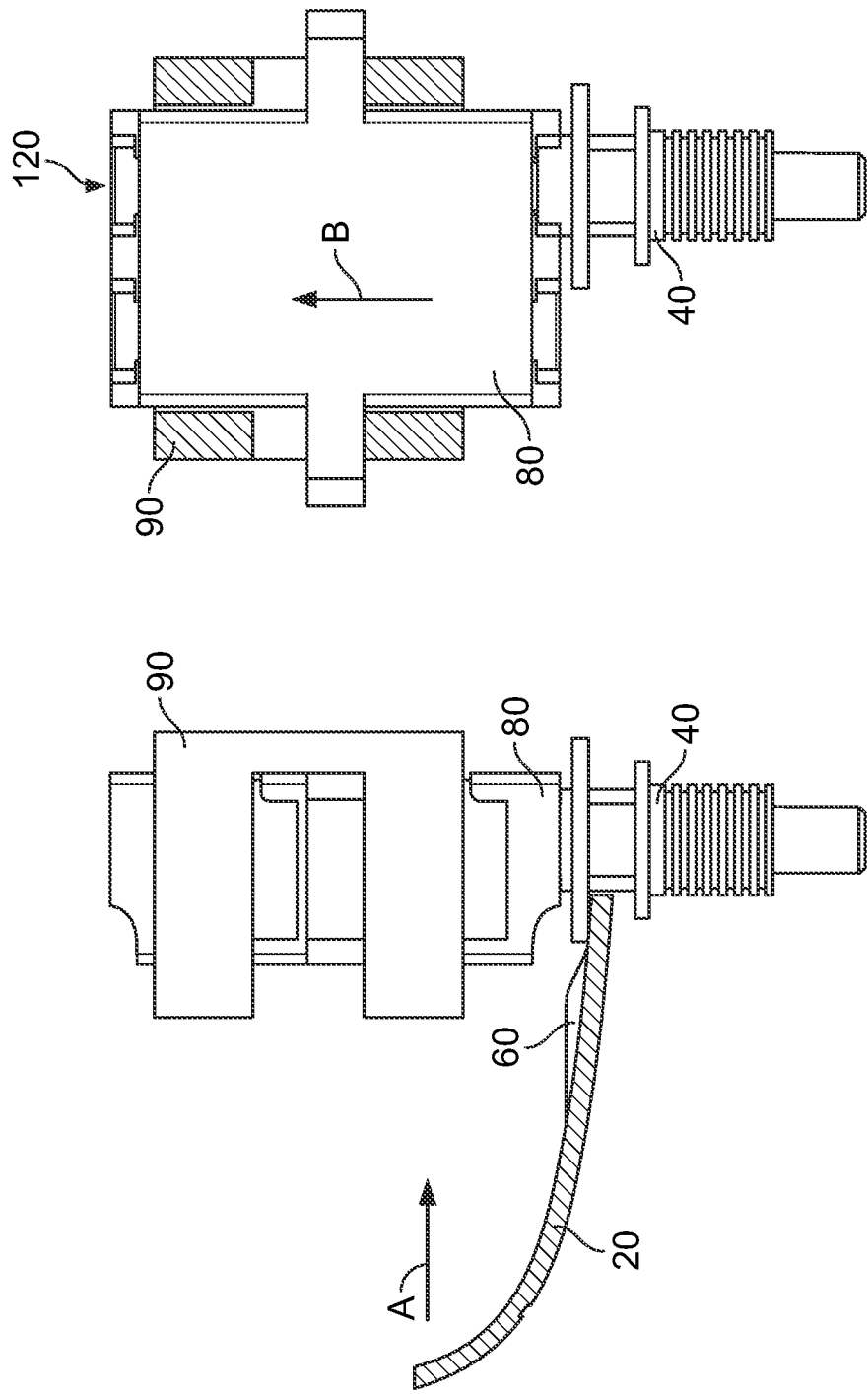
FIGS. 5 and 6 show schematically in side and partly sectioned front views the operation of the spacer means on the position of the adaptor within the holder according to the invention.
Figure 6:
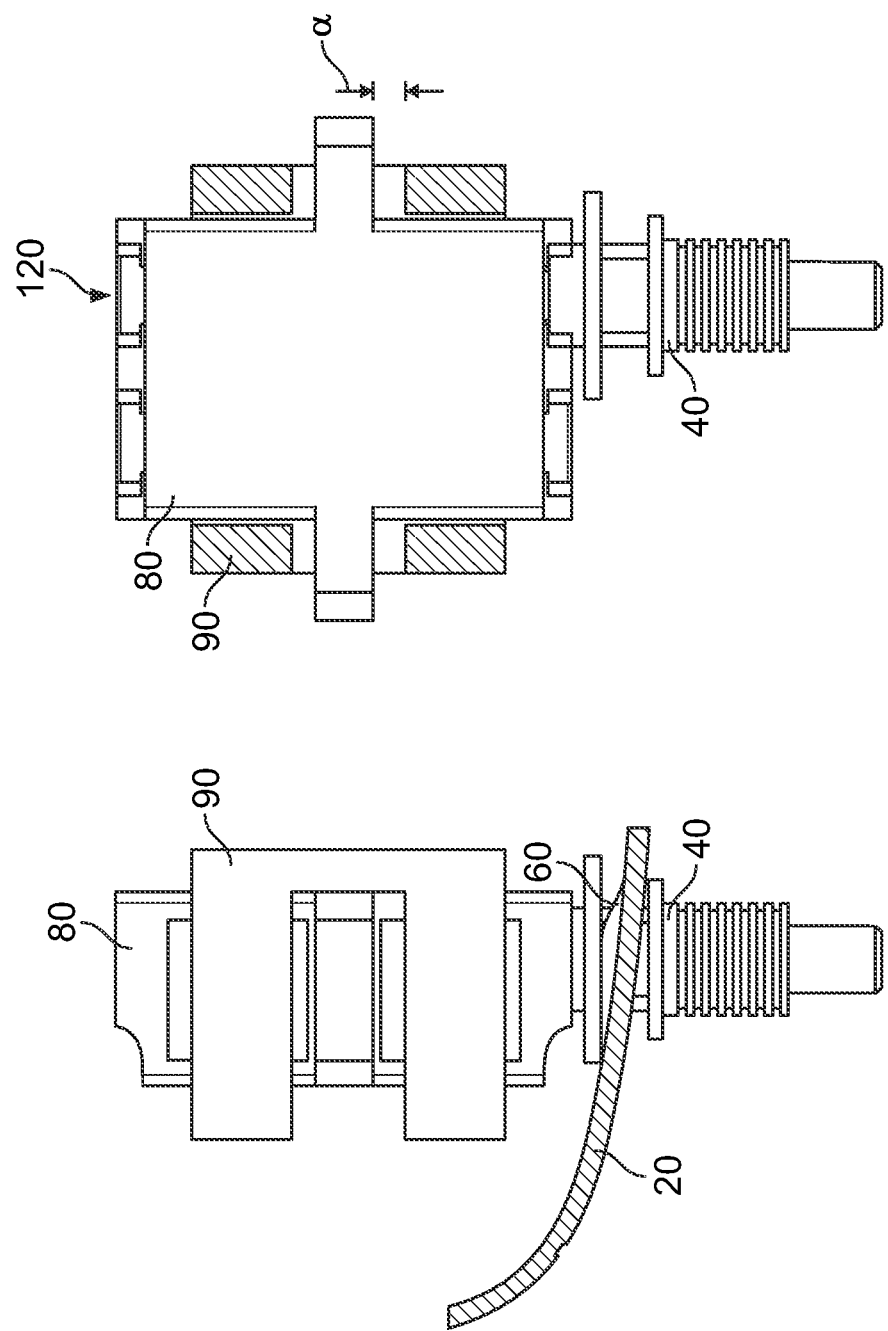

In FIGS. 5 and 6, the cable is now shown lying vertically, as it usually does when the connection box 10 is mounted on a wall of a dwelling, and these Figures show the holder and adaptor in partially-sectioned side and front views respectively on the left and right of the Figure. In the side view of FIG. 5, the closing lid 20 is shown approaching the cable connector 40 in the direction of arrow A, just before the slot 30 (not visible in this view) begins to engage the connector. The adaptor 80 is shown in its most forward position within the holder 90, ready for movement in the direction of arrow B as shown in the front view when the spacer ribs 60 progressively engage the connector 40 on closure of the lid 20. FIG. 6 shows the fully-closed position of the lid 20, in which the spacer ribs 60 have engaged the connector 40 and have thus pushed the adaptor 80 rearwards within the holder 90 by a distance ά(alpha), which may be less than the available "float" distance ΔX (FIG. 4), provided that the distance ά is greater than the likely flexural deformation distance of the casing as aforesaid. The size and shape of the spacer ribs 60 are selected thus to provide automatically a preventive axial push-back of the adaptor 80 giving sufficient slack to avoid or at least reduce the risk of flexural casing deformation caused by axial tension on the cable disrupting the optical connection contained within the adaptor.

It will be understood for all forms of this invention that, if the adaptor 80 were in fixed relationship to the casing 20, then flexural deformation of the casing by tension on the cable could pull apart and disrupt the face-to-face optical connection formed within the adaptor between the illustrated connector 40 and another cable or optical device (not shown), for example entering at the opposite port 120 of the adaptor shown in FIGS. 5 and 6. The form of the spacer means is not critical provided that it achieves the above effect. Alternative forms of spacer could be used, including for example lugs arranged to push directly on the adaptor as it is frontally approached by closure of a hinged lid, without the sliding or wedging action of the illustrated tapered ribs 60. In preferred enclosures according to this invention having a plastics casing thickness within the range range from 0.5 mm to 4 mm, the spacer means will be arranged to produce a preventive axial push-back distance of at least 0.2 mm, more preferably at least 1 mm, possibly up to 2 mm.

Figure 7A:
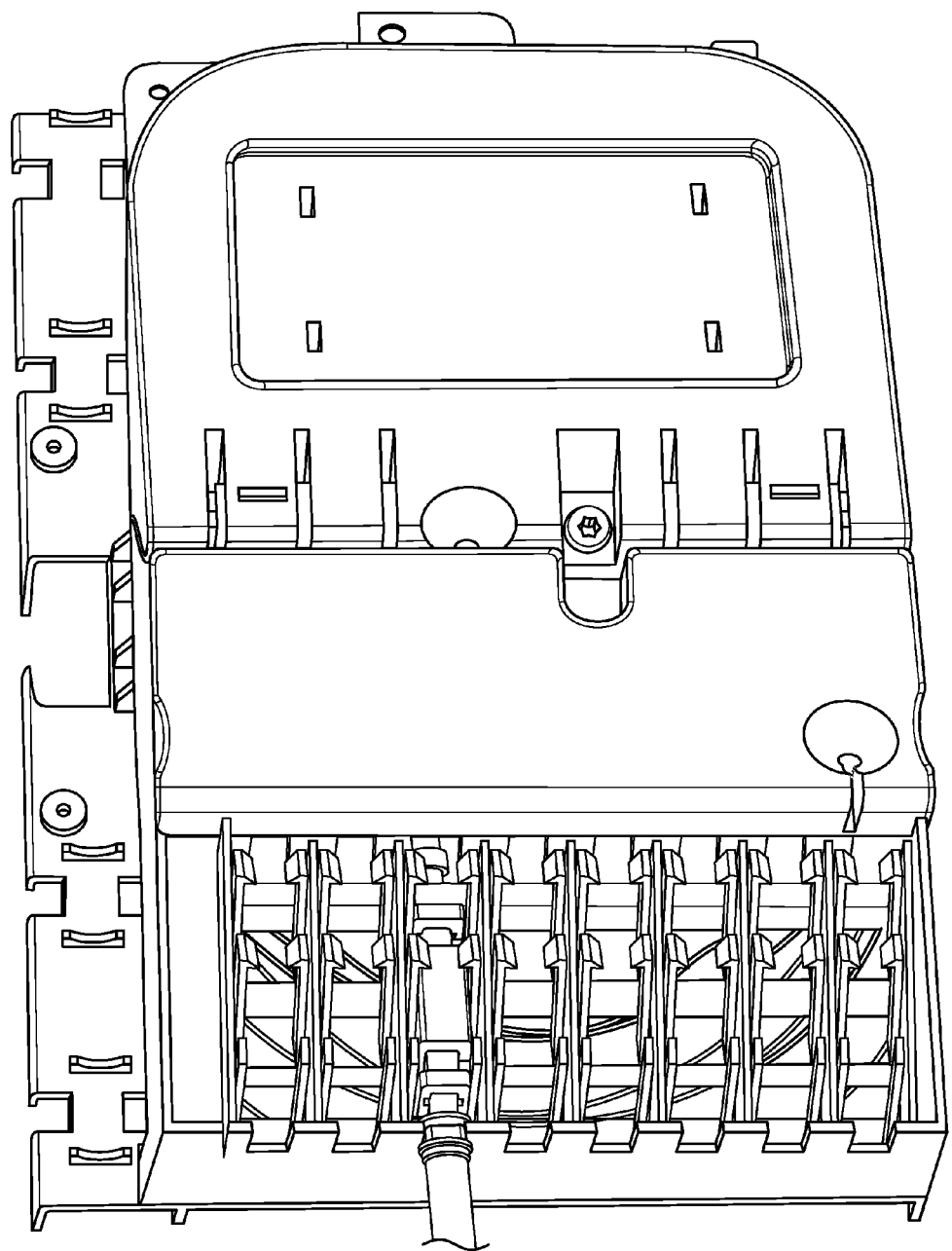
FIGS. 7A and 7B show an alternative embodiment of the invention where the adaptor is directly positioned in the holder without the closing lid action.
Figure 7B:
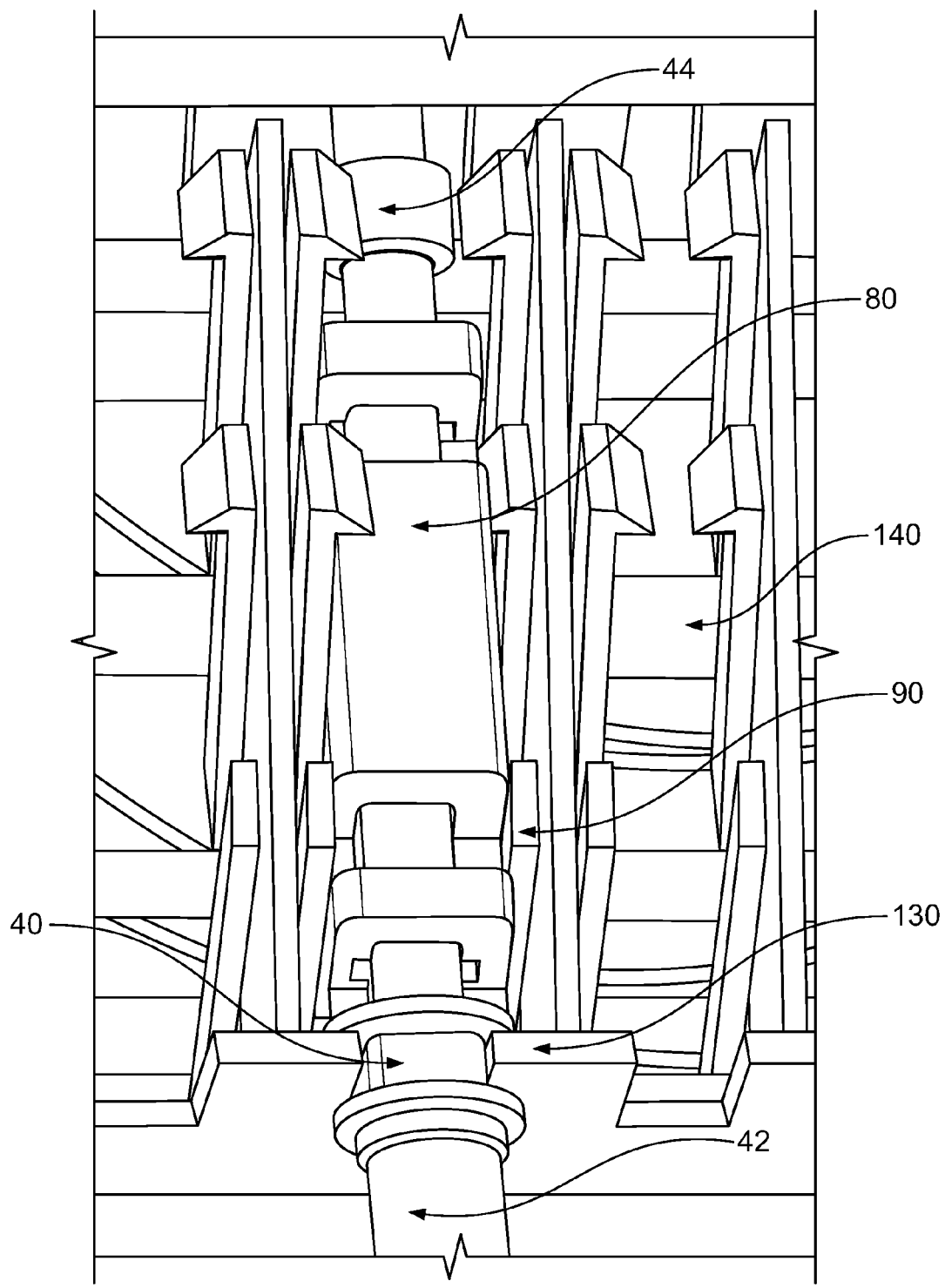

FIG. 7A shows an optical cable enclosure having exposed holders into which optical connection adaptors can be fitted directly with limited space to move or "float" within the holders according to the invention without need for the closing lid action hereinbefore described. FIG. 7B shows in closer detail one of the holders 90, which may be integral with or separately attached to the casing 130 and/or the base 140 of the enclosure. The optical cable 42 has a collared connector 40 positioned in a slot within an upstanding part 130 of the enclosure casing to provide strain relief. The optical connection adaptor 80 is directly fitted (preferably snap-fitted) into the holder 90 with room for the aforementioned axial movement of the adaptor within the holder over a distance greater than the flexural distortion distance of the casing part 130 caused by traction on the cable 42. The resulting axial "float" effect thus avoids or reduces disruption of the optical connection (not visible in this view) inside the adaptor between the optical fibre of cable 42 and that of a co-operating cable 44 emerging from the main body of the enclosure shown in FIG. 7A.

The invention claimed is:

1. An enclosure for optical fibre cable or patch cord connections comprising a casing, an optical connection adaptor, a holder for the connection adaptor, and cable or cord strain relief means attachable to the casing, wherein the holder is integral with or secured or securable within the casing and allows limited axial movement of the adaptor inside the holder over an axial distance greater than the distance of flexural distortion of the casing which is caused at the point of strain relief attachment by manual traction on the cable or cord outside the casing, wherein the casing is closable around the adaptor and holder to attach the cable or cord to the casing and the casing includes spacer means which on closure of the casing acts to push the adaptor within the holder away from the casing to an axial distance greater than the distance of flexural distortion of the casing which is caused at the point of strain relief attachment by manual traction on the cable or cord outside the casing.

2. An enclosure according to claim 1, wherein the said axial distance is greater than the flexural casing distortion distance caused by the maximum traction force applicable to the cable without dislodging the strain relief attachment.

3. An enclosure according to claim 1, wherein the casing is made of plastics material and has a thickness within the range from 0.5 mm to 4 mm, and the spacer means is arranged to produce a preventive axial push-back distance of at least 0.2 mm.

4. An enclosure according to claim 3, wherein spacer means is arranged to produce a preventive axial push-back distance of at least 1 mm.

5. An enclosure according to claim 4, wherein spacer means is arranged to produce a preventive axial push-back distance of at least 2 mm.

6. An enclosure according to claim 1, wherein the adaptor is snap-fitted into the holder.

7. An enclosure for optical fibre cable or patch cord connections, comprising:
   a casing;
   an optical connection adaptor allowing connection of optical connectors along an axial direction;
   a holder for movably holding the connection adaptor therein; and
   a cable or cord strain relief member attachable to the casing;
   wherein the holder allows limited movement of the adaptor inside the holder over an axial distance greater than the distance of flexural distortion of the casing at the point of strain relief attachment by manual traction on the cable or cord outside the casing, and wherein the casing is closable around the adaptor and holder to attach the cable or cord to the casing and the casing includes at least one spacer which on closure of the casing acts to push the adaptor within the holder away from the casing to an axial distance greater than the distance of flexural distortion of the casing which is caused at the point of strain relief attachment by manual traction on the cable or cord outside the casing.

8. An enclosure according to claim 7, wherein the said axial distance is greater than the flexural casing distortion distance caused by the maximum traction force applicable to the cable without dislodging the strain relief attachment.

9. An enclosure according to claim 7, wherein the casing is made of plastics material and has a thickness within the range from 0.5 mm to 4 mm, and the spacer is arranged to produce a preventive axial push-back distance of at least 0.2 mm.

10. An enclosure according to claim 9, wherein spacer means is arranged to produce a preventive axial push-back distance of at least 1 mm.

11. An enclosure according to claim 10, wherein spacer means is arranged to produce a preventive axial push-back distance of at least 2 mm.

12. An enclosure according to claim 7, wherein the adaptor is snap-fitted into the holder.

13. An enclosure according to claim 7, wherein the casing comprises a lid having a slot, the lid being rotatable or slidable for receipt of a cable in the slot.

14. An enclosure according to claim 13, wherein the lid comprises plural spacers positioned on an inside of the lid, flanking the slot.

15. An enclosure for optical fibre cable or patch cord connections comprising a casing, an optical connection adaptor, a holder for the connection adaptor, and cable or cord strain relief means attachable to the casing, wherein the casing is closable around the adaptor and holder to attach the cable or cord to the casing and the casing includes spacer means which on closure of the casing acts to push the adaptor within the holder away from the casing to an axial distance greater than the distance of flexural distortion of the casing which is caused at the point of strain relief attachment by manual traction on the cable or cord outside the casing.

\* \* \* \* \*

UNITED STATES PATENT AND TRADEMARK OFFICE
CERTIFICATE OF CORRECTION

PATENT NO. : 8,417,082 B2  
APPLICATION NO. : 12/600088  
DATED : April 9, 2013  
INVENTOR(S) : Kristof Vastmans and Mohammed Labraymi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 290 days.

Signed and Sealed this  
Fifth Day of November, 2013

Teresa Stanek Rea  
*Deputy Director of the United States Patent and Trademark Office*